(12) United States Patent
Huxham et al.

(10) Patent No.: US 11,176,536 B2
(45) Date of Patent: Nov. 16, 2021

(54) TOKEN GENERATING COMPONENT

(71) Applicant: Visa International Service Association, San Francisco, CA (US)

(72) Inventors: Horatio Nelson Huxham, Cape Town (ZA); Alan Joseph O'Regan, Cape Town (ZA); Hough Arie Van Wyk, Cape Town (ZA); Tara Anne Moss, Cape Town (ZA)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 245 days.

(21) Appl. No.: 16/379,334

(22) Filed: Apr. 9, 2019

(65) Prior Publication Data

US 2019/0236584 A1  Aug. 1, 2019

Related U.S. Application Data

(63) Continuation of application No. 14/648,510, filed as application No. PCT/IB2013/060696 on Dec. 6, 2013, now Pat. No. 10,304,047.

(30) Foreign Application Priority Data

Dec. 7, 2012 (ZA) .................. 2012-09284

(51) Int. Cl.
*G06Q 20/32* (2012.01)
*H04L 29/06* (2006.01)
(Continued)

(52) U.S. Cl.
CPC ......... *G06Q 20/3229* (2013.01); *G06F 21/35* (2013.01); *G06Q 20/327* (2013.01);
(Continued)

(58) Field of Classification Search
CPC .... G06Q 20/382; G06Q 10/00; G06Q 10/107; G06Q 20/10; G06Q 20/102; G06Q 20/12;
(Continued)

(56) References Cited

U.S. PATENT DOCUMENTS 4,423,287 A   12/1983   Zeidler
5,412,730 A   5/1995    Jones
(Continued)

FOREIGN PATENT DOCUMENTS

WO   2015179637   11/2015

OTHER PUBLICATIONS

U.S. Appl. No. 14/600,523, Secure Payment Processing Using Authorization Request, filed Jan. 20, 2015, 42 pages.
(Continued)

*Primary Examiner* — Scott S Trotter
*Assistant Examiner* — Slade E Smith
(74) *Attorney, Agent, or Firm* — Kilpatrick Townsend & Stockton LLP

(57) ABSTRACT

The invention provides a method and system for providing financial details from a mobile device of a user for use in a transaction. The method is performed on a mobile device of the user and includes the steps of generating, on a token generating component, a session-specific token by applying an algorithm requiring a dynamic key; providing financial details for use in a transaction; incorporating the session-specific token and the financial details into a modified form the financial details; and transferring the modified form of the financial details from the mobile device to initiate the transaction. A corresponding method and system for validating financial details received, at a server of an issuing authority, is also provided.

19 Claims, 10 Drawing Sheets

(51) Int. Cl.
*G06F 21/35* (2013.01)
*G06Q 20/38* (2012.01)
*H04W 12/40* (2021.01)
*H04W 12/06* (2021.01)

(52) U.S. Cl.
CPC ......... *G06Q 20/382* (2013.01); *H04L 63/067* (2013.01); *H04L 63/068* (2013.01); *H04W 12/068* (2021.01); *H04W 12/40* (2021.01); *G06F 2221/2137* (2013.01)

(58) Field of Classification Search
CPC ............ G06Q 20/305; G06Q 20/3229; G06Q 20/327; G06Q 20/40; G06Q 20/4014; G06F 21/35; G06F 2221/2137; H04L 63/067; H04L 63/068; H04L 63/0807; H04L 63/083; H04L 67/142; H04W 12/06
USPC ........................................................ 705/67
See application file for complete search history.

(56) References Cited

U.S. PATENT DOCUMENTS

| | | | |
|---|---|---|---|
| 5,907,621 A * | 5/1999 | Bachman | H04L 63/0807 713/155 |
| 5,956,408 A | 9/1999 | Arnold | |
| 6,058,193 A | 5/2000 | Cordery et al. | |
| 6,112,187 A | 8/2000 | Fukawa | |
| 6,667,700 B1 | 12/2003 | Mccanne et al. | |
| 6,996,722 B1 | 2/2006 | Fairman et al. | |
| 7,011,247 B2 | 3/2006 | Drabczuk et al. | |
| 7,069,439 B1 | 6/2006 | Chen et al. | |
| 7,209,561 B1 | 4/2007 | Shankar et al. | |
| 7,213,766 B2 | 5/2007 | Ryan et al. | |
| 7,430,668 B1 | 9/2008 | Chen et al. | |
| 7,818,264 B2 | 10/2010 | Hammad | |
| 7,848,980 B2 | 12/2010 | Carlson | |
| 7,874,010 B1 | 1/2011 | Perlman | |
| 7,908,216 B1 | 3/2011 | Davis et al. | |
| 7,937,324 B2 | 5/2011 | Patterson | |
| 8,078,593 B1 | 12/2011 | Ramarao | |
| 8,121,295 B1 | 2/2012 | Everson et al. | |
| 8,151,345 B1 | 4/2012 | Yeager | |
| 8,175,973 B2 | 5/2012 | Davis et al. | |
| 8,190,523 B2 | 5/2012 | Patterson | |
| 8,219,489 B2 | 7/2012 | Patterson | |
| 8,229,852 B2 | 7/2012 | Carlson | |
| 8,281,991 B2 | 10/2012 | Wentker et al. | |
| 8,307,210 B1 | 11/2012 | Duane | |
| 8,336,088 B2 | 12/2012 | Raj et al. | |
| 8,346,666 B2 | 1/2013 | Lindelsee et al. | |
| 8,433,116 B2 | 4/2013 | Butler et al. | |
| 8,504,475 B2 | 8/2013 | Brand et al. | |
| 8,577,813 B2 | 11/2013 | Weiss | |
| 8,762,263 B2 | 6/2014 | Gauthier et al. | |
| 8,793,186 B2 | 7/2014 | Patterson | |
| 8,838,982 B2 | 9/2014 | Carlson et al. | |
| 8,856,539 B2 | 10/2014 | Weiss | |
| 9,065,643 B2 | 6/2015 | Hurry et al. | |
| 9,070,129 B2 | 6/2015 | Sheets et al. | |
| 9,100,826 B2 | 8/2015 | Weiss | |
| 9,160,741 B2 | 10/2015 | Wentker et al. | |
| 9,229,964 B2 | 1/2016 | Stevelinck | |
| 9,245,267 B2 | 1/2016 | Singh | |
| 9,249,241 B2 | 2/2016 | Dai et al. | |
| 9,256,871 B2 | 2/2016 | Anderson et al. | |
| 9,271,110 B1 | 2/2016 | Fultz et al. | |
| 9,280,765 B2 | 3/2016 | Hammad | |
| 9,530,137 B2 | 12/2016 | Weiss | |
| 9,860,245 B2 | 1/2018 | Ronda et al. | |
| 9,911,117 B1 | 3/2018 | Everhart | |
| 2002/0184511 A1 | 12/2002 | Kolouch | |
| 2003/0056092 A1 * | 3/2003 | Edgett | H04L 63/0442 713/153 |
| 2003/0084292 A1 | 5/2003 | Pierce et al. | |
| 2003/0212894 A1 | 11/2003 | Buck et al. | |
| 2004/0034783 A1 | 2/2004 | Fedronic et al. | |
| 2005/0069171 A1 | 3/2005 | Rhoads et al. | |
| 2005/0137983 A1 | 6/2005 | Bells | |
| 2005/0140964 A1 | 6/2005 | Eschenauer et al. | |
| 2005/0154923 A1 | 7/2005 | Lok et al. | |
| 2005/0166263 A1 | 7/2005 | Nanopoulos et al. | |
| 2005/0190914 A1 | 9/2005 | Chen et al. | |
| 2006/0075254 A1 | 4/2006 | Henniger | |
| 2006/0177061 A1 * | 8/2006 | Orsini | H04L 63/08 380/268 |
| 2006/0255158 A1 | 11/2006 | Margalit et al. | |
| 2006/0287965 A1 | 12/2006 | Bajan | |
| 2006/0288216 A1 | 12/2006 | Buhler et al. | |
| 2007/0066398 A1 | 3/2007 | Rowan | |
| 2007/0067833 A1 | 3/2007 | Colnot | |
| 2007/0143227 A1 | 6/2007 | Kranzley et al. | |
| 2007/0150942 A1 | 6/2007 | Cartmell | |
| 2007/0157298 A1 * | 7/2007 | Dingwall | G06F 21/41 726/8 |
| 2007/0262138 A1 | 11/2007 | Somers et al. | |
| 2008/0077799 A1 * | 3/2008 | Labaton | H04L 63/0823 713/184 |
| 2008/0148057 A1 | 6/2008 | Hauw | |
| 2008/0154770 A1 * | 6/2008 | Rutherford | G06Q 20/341 705/44 |
| 2008/0172738 A1 | 7/2008 | Bates et al. | |
| 2009/0060184 A1 | 3/2009 | Alten | |
| 2009/0097661 A1 * | 4/2009 | Orsini | G06F 21/45 380/279 |
| 2009/0217046 A1 * | 8/2009 | Labaton | H04L 63/0838 713/172 |
| 2009/0281948 A1 | 11/2009 | Carlson | |
| 2009/0313318 A1 | 12/2009 | Dye et al. | |
| 2010/0017867 A1 | 1/2010 | Fascenda | |
| 2010/0024024 A1 | 1/2010 | Siourthas et al. | |
| 2010/0077216 A1 | 3/2010 | Kramer et al. | |
| 2010/0146259 A1 * | 6/2010 | Tatham | G06F 21/31 713/152 |
| 2010/0146263 A1 * | 6/2010 | Das | G06Q 20/425 713/155 |
| 2010/0205448 A1 * | 8/2010 | Tarhan | G06F 21/33 713/185 |
| 2010/0289627 A1 | 11/2010 | McAllister et al. | |
| 2010/0299267 A1 | 11/2010 | Faith et al. | |
| 2011/0022521 A1 * | 1/2011 | Collinge | G06Q 20/3674 705/67 |
| 2011/0047076 A1 | 2/2011 | Carlson et al. | |
| 2011/0103586 A1 | 5/2011 | Nobre | |
| 2011/0153498 A1 | 6/2011 | Makhotin et al. | |
| 2011/0154467 A1 | 6/2011 | Bomar et al. | |
| 2011/0178926 A1 | 7/2011 | Lindelsee et al. | |
| 2011/0191592 A1 | 8/2011 | Goertzen | |
| 2011/0197070 A1 | 8/2011 | Mizrah | |
| 2011/0202466 A1 * | 8/2011 | Carter | G06Q 20/3224 705/67 |
| 2011/0237224 A1 | 9/2011 | Coppinger | |
| 2011/0258111 A1 | 10/2011 | Raj et al. | |
| 2011/0258121 A1 * | 10/2011 | Kauniskangas | G06Q 20/20 705/67 |
| 2011/0270751 A1 * | 11/2011 | Csinger | G06F 21/40 705/42 |
| 2011/0276485 A1 * | 11/2011 | Varga | G06Q 40/02 705/44 |
| 2011/0302646 A1 * | 12/2011 | Ronda | H04L 63/0853 726/9 |
| 2011/0307699 A1 | 12/2011 | Fielder | |
| 2012/0023567 A1 | 1/2012 | Hammad | |
| 2012/0030047 A1 | 2/2012 | Fuentes et al. | |
| 2012/0060025 A1 | 3/2012 | Cahill | |
| 2012/0110318 A1 | 5/2012 | Stone | |
| 2012/0179952 A1 | 7/2012 | Tuyls et al. | |
| 2012/0203700 A1 | 8/2012 | Ornce et al. | |
| 2012/0221421 A1 | 8/2012 | Hammad | |
| 2012/0226582 A1 | 9/2012 | Hammad | |
| 2012/0246079 A1 | 9/2012 | Wilson et al. | |
| 2012/0331088 A1 * | 12/2012 | O'Hare | G06F 21/6227 709/214 |

(56) References Cited

U.S. PATENT DOCUMENTS

| | | |
|---|---|---|
| 2013/0018757 A1 | 1/2013 | Anderson et al. |
| 2013/0031006 A1 | 1/2013 | McCullagh et al. |
| 2013/0047263 A1 | 2/2013 | Radhakrishnan |
| 2013/0085944 A1 | 4/2013 | Fielder |
| 2013/0124416 A1* | 5/2013 | Pawar .................. G06Q 20/10 705/44 |
| 2013/0159184 A1 | 6/2013 | Thaw |
| 2013/0159195 A1 | 6/2013 | Kirillin et al. |
| 2013/0198080 A1 | 8/2013 | Anderson et al. |
| 2013/0212026 A1 | 8/2013 | Powell et al. |
| 2013/0218769 A1 | 8/2013 | Pourfallah et al. |
| 2013/0226799 A1 | 8/2013 | Raj |
| 2013/0226815 A1 | 8/2013 | Ibasco et al. |
| 2013/0246199 A1 | 9/2013 | Carlson |
| 2013/0246261 A1 | 9/2013 | Purves et al. |
| 2013/0262317 A1 | 10/2013 | Collinge et al. |
| 2013/0268776 A1 | 10/2013 | Motoyama |
| 2013/0282588 A1* | 10/2013 | Hruska .................. G06Q 20/40 705/67 |
| 2013/0290719 A1 | 10/2013 | Kaier et al. |
| 2013/0297501 A1 | 11/2013 | Monk et al. |
| 2013/0325709 A1* | 12/2013 | Pollin .................. G06Q 10/107 705/40 |
| 2013/0326602 A1 | 12/2013 | Chen |
| 2014/0004817 A1 | 1/2014 | Horton et al. |
| 2014/0013452 A1 | 1/2014 | Aissi et al. |
| 2014/0019352 A1 | 1/2014 | Shrivastava |
| 2014/0019364 A1 | 1/2014 | Hurry et al. |
| 2014/0019752 A1 | 1/2014 | Yin et al. |
| 2014/0047551 A1 | 2/2014 | Nagasundaram et al. |
| 2014/0058951 A1* | 2/2014 | Kuppuswamy ...... G06Q 20/341 705/67 |
| 2014/0068706 A1 | 3/2014 | Aissi |
| 2014/0074637 A1 | 3/2014 | Hammad |
| 2014/0074724 A1 | 3/2014 | Gordon et al. |
| 2014/0082366 A1 | 3/2014 | Engler et al. |
| 2014/0108172 A1 | 4/2014 | Weber et al. |
| 2014/0108265 A1 | 4/2014 | Hayhow et al. |
| 2014/0114857 A1 | 4/2014 | Griggs et al. |
| 2014/0136418 A1 | 5/2014 | Fielder |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0128243 A1 | 5/2015 | Roux et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0302390 A1 | 10/2015 | Huxham et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339664 A1 | 11/2015 | Wong et al. |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0224976 A1 | 8/2016 | Basu et al. |
| 2016/0359850 A1* | 12/2016 | Weiss ............... G06Q 20/40145 |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |

OTHER PUBLICATIONS

U.S. Appl. No. 14/648,510 , "Final Office Action", dated Apr. 17, 2018, 84 pages.

U.S. Appl. No. 14/648,510 , "Non-Final Office Action", dated Oct. 18, 2017, 77 pages.

U.S. Appl. No. 14/648,510 , "Notice of Allowance", dated Jan. 9, 2019, 19 pages.

U.S. Appl. No. 14/719,014 , "Restriction Requirement", dated May 26, 2016, 6 pages.

U.S. Appl. No. 15/008,388 , Methods for Secure Credential Provisioning, filed Jan. 27, 2016, 89 pages.

U.S. Appl. No. 15/011,366 , Token Check Offline, filed Jan. 29, 2016, 60 pages.

U.S. Appl. No. 15/019,157 , Token Processing Utilizing Multiple Authorizations, filed Feb. 9, 2016, 63 pages.

U.S. Appl. No. 15/041,495 , Peer Forward Authorization of Digital Requests, filed Feb. 11, 2016, 63 pages.

U.S. Appl. No. 15/265,282 , Self-Cleaning Token Vault, filed Sep. 14, 2016, 52 pages.

U.S. Appl. No. 15/462,658 , Replacing Token on a Multi-Token User Device, filed Mar. 17, 2017, 58 pages.

U.S. Appl. No. 61/738,832 , Management of Sensitive Data, filed Dec. 18, 2012, 22 pages.

U.S. Appl. No. 61/751,763 , Payments Bridge, filed Jan. 11, 2013, 64 pages.

U.S. Appl. No. 61/879,632 , Systems and Methods for Managing Mobile Cardholder Verification Methods, filed Sep. 18, 2013, 24 pages.

U.S. Appl. No. 61/892,407 , Issuer Over-the-Air Update Method and System, filed Oct. 17, 2013, 28 pages.

U.S. Appl. No. 61/894,749 , Methods and Systems for Authentication and Issuance of Tokens in a Secure Environment, filed Oct. 23, 2013, 67 pages.

U.S. Appl. No. 61/926,236 , Methods and Systems for Provisioning Mobile Devices With Payment Credentials and Payment Token Identifiers, filed Jan. 10, 2014, 51 pages.

U.S. Appl. No. 62/000,288 , Payment System Canonical Address Format, filed May 19, 2014, 58 pages.

U.S. Appl. No. 62/003,717 , Mobile Merchant Application, filed May 28, 2014, 58 pages.

U.S. Appl. No. 62/024,426 , Secure Transactions Using Mobile Devices, filed Jul. 14, 2014, 102 pages.

U.S. Appl. No. 62/037,033 , Sharing Payment Token, filed Aug. 13, 2014, 36 pages.

U.S. Appl. No. 62/038,174 , Customized Payment Gateway, filed Aug. 15, 2014, 42 pages.

U.S. Appl. No. 62/042,050 , Payment Device Authentication and Authorization System, filed Aug. 26, 2014, 120 pages.

(56) References Cited

OTHER PUBLICATIONS

U.S. Appl. No. 62/053,736, Completing Transactions Without a User Payment Device, filed Sep. 22, 2014, 31 pages.
U.S. Appl. No. 62/054,346, Mirrored Token Vault, filed Sep. 23, 2014, 38 pages.
U.S. Appl. No. 62/103,522, Methods and Systems for Wallet Provider Provisioning, filed Jan. 14, 2015, 39 pages.
U.S. Appl. No. 62/108,403, Wearables With NFC HCE, filed Jan. 27, 2015, 32 pages.
U.S. Appl. No. 62/117,291, Token and Cryptogram Using Transaction Specific Information, filed Feb. 17, 2015, 25 pages.
U.S. Appl. No. 62/128,709, Tokenizing Transaction Amounts, filed Mar. 5, 2015, 30 pages.
PCT/US2015/031968, "International Search Report and Written Opinion", dated Jul. 27, 2015, 7 pages.

\* cited by examiner

TOKEN GENERATING COMPONENT

CROSS-REFERENCES TO RELATED APPLICATIONS

This application is a continuation of U.S. patent application Ser. No. 14/648,510, filed May 29, 2015, which is a National Stage of International Application No. PCT/IB2013/060696, filed Dec. 6, 2013, which claims priority from South African Provisional Patent Application No. 2012/09284, filed Dec. 7, 2012, the disclosures of which are incorporated herein by reference.

BACKGROUND

This invention relates to a device, system and method for generating tokens for security purposes.

Many applications utilize token generation to enhance security through the provision of session specific tokens. Token generators often require a user to carry hardware with them, such as key fobs, cards, or USB devices, which are required for the generation of the session specific token. Carrying such devices may be inconvenient to a user.

The abovementioned hardware-type token generators often use time-based encryption, wherein the current time upon generation of a session-specific token is used as an input value to the algorithm used. The use of a time as an input value is an example of dynamic key use, where a continuously changing (dynamic) key is used as an input value to the algorithm used for determining the session specific token. A dynamic key ensures that the algorithm will provide a different result each time that the result of the algorithm is determined. If the same input value is used more than once in a token generating device which utilizes a single algorithm, the same result will be obtained. By including a dynamic input value, a different result should be obtained after each calculation.

A major problem which is often encountered with hardware-type token generators which use time as an input value is that the clock which provides the time to the hardware has to be synchronized with the clock of a service provider who has to check the validity of a generated token. Should the clocks not be synchronized, a validly generated token may not be recognized as valid when it is checked by a service provider with a clock that is out-of-sync to the clock of the hardware.

Mobile banking involves the use of a mobile device to pay for goods or services at a point-of-sale (POS) of a merchant, or even remotely. Mobile payments, in turn, refer to payment services performed with the use of a mobile device. Examples of mobile payments include situations in which details of a person's financial transaction card, such as a debit or credit card, is stored on the person's mobile device, typically in the format of Track 1 or Track 2 card data. Track 1 and Track 2 are standardized formats in which properties of a financial transaction card are stored on the cards themselves.

The mobile device transfers the details of a person's financial transaction card to a POS terminal of a merchant where a user wishes to transact, for example by means of near-field communications technology. The POS terminal, in turn, transmits the details to an issuing authority that is to approve or deny payment from an account of the user held by the issuing authority. Security concerns do however still exist with regards to mobile payments, for example regarding the possibility of the interception of the details during its transfer, or the access protection offered by the mobile device with regards to the payments cards stored thereon.

BRIEF SUMMARY

In accordance with an embodiment of the invention there is provided a method for providing financial details from a mobile device of a user for use in a transaction, the method being performed on a mobile device of the user and including the steps of:

generating, on a token generating component associated with the mobile device, a session-specific token by applying an algorithm stored on the token generating component with a dynamic key;

providing financial details in a pre-determined format for use in a transaction;

incorporating the session-specific token and the financial details into a modified form of the financial details; and transferring the modified form of the financial details in the pre-determined format from the mobile device to initiate the transaction.

Further features of the invention provide for the step of incorporating the session-specific token and the financial details into a modified form of the financial details to include inserting the session-specific token into redundant characters in the pre-determined format; and to include encrypting a portion of the characters of the financial details with the session-specific token.

Still further features of the invention provide for the algorithm stored on the token generating component to include an individual seed value for a customer; and for the modified form of the financial details to include a readable customer identifier.

Yet further features of the invention provide for the algorithm stored on the token generating component to include a seed value for an issuing authority; and for the modified form of the financial details to include a readable issuing authority identifier and an initiation vector.

In one embodiment of the invention, the dynamic key acts as the seed value. In a further embodiment, the user has a unique seed value, and the issuing authority has a database storing details relating to customer's respective unique seed values.

Further features of the invention provide for the step of generating, on a token generating component associated with the mobile device, a session-specific token by applying an algorithm stored on the token generating component with a dynamic key, generates the session-specific token offline from an issuing authority and the dynamic key is coordinated between the mobile device and the issuing authority.

A still further feature of the invention provides for the session-specific token to be generated without a communication channel to a issuing authority that is to verify the validity of the token, the issuing authority able to determine the session-specific token used, and its validity.

A yet further feature of the invention provides for the dynamic key and one of a customer identifier or an initialization vector for a customer to enable the session-specific token to be reversed by an issuing authority to authenticate a customer.

A further feature of the invention provides for the financial details to include static customer account details or one-time generated customer account details.

Still further features of the invention provide for the dynamic key to be randomly selected from a pre-calculated set of keys; and for a key serial number related to the dynamic key to be transferred along with the modified form of the financial details, wherein the key serial number is able to determine the dynamic key that was used.

Yet further features of the invention provide for the dynamic key to be a counter value which increments or changes every time the algorithm is applied; or to be a based on a time signal derived by the mobile device and at which the generation of the session-specific token is carried out.

Still further features of the invention provide for the session-specific token to be inserted in redundant characters in the pre-determined format; for the format to be compatible with a POS terminal; for the format to be the Track 1 or Track 2 data format of a financial transaction card; and for the session-specific token to be inserted at least partially in any one or more of a field normally reserved for an expiration date, a card security code, a service code, discretionary data, or a name. In one embodiment of the invention, the token is inserted into the card security code only, and the card security code can be described as a dynamic card security code.

In one embodiment of the invention, the financial details are transferred to a point-of-sale (POS) terminal of a merchant, from where it is further transferred to the issuing authority.

Further features of the invention provide for the token generating component to be a cryptographic expansion device that can be attached to a communication component of the mobile device; and for the cryptographic expansion device to be configured to be used with the mobile device without requiring any changes to the internal software or hardware of the mobile device and without requiring any modification to the communication protocols used by the mobile device.

The invention further extends to the cryptographic expansion device being a cryptographic label that includes a hardware security module (HSM) disposed therein including a secure processing unit and a public processing unit.

In one embodiment of the invention, the cryptographic label also includes a first set of electrical contacts disposed on the top side of the cryptographic label for interfacing to a mobile device, and a second set of electrical contacts disposed on the bottom side of the cryptographic label for interfacing to a communication component. A coupling element may also be provided to attach the cryptographic label to the communication component. In an exemplary embodiment, the mobile device can be a mobile phone, the communication component can be a subscriber identity module (SIM) card, and the coupling element used for attaching the cryptographic label to the communication component can be an adhesive material disposed on the cryptographic label.

The invention extends to a method for determining the validity of financial details, the method being performed at a server and including the steps of:

receiving a pre-determined format of financial details for a transaction;

extracting a session-specific token from the pre-determined format;

generating, on a token generating component associated with the server, at least one expected session-specific token by applying an algorithm with a dynamic key;

comparing the at least one expected session-specific token and the extracted session-specific token; and in response to the extracted session-specific token matching at least one expected session-specific token, approving the received financial details for use; or, in response to the extracted session-specific token matching none of the at least one expected session-specific tokens, rejecting the financial details for use.

A further feature of the invention provides for the step of extracting the session-specific token from the pre-determined format to include extracting the session-specific token from redundant characters in the pre-determined format.

Still further features of the invention provide for the algorithm stored on the token generating component to include an individual seed value for a customer; and for the received pre-determined format of financial details to include a readable customer identifier.

Yet further features of the invention provide for the algorithm stored on the token generating component to include a seed value for an issuing authority; and for the received pre-determined format of financial details to include a readable issuing authority identifier and an initialization vector.

Further features of the invention provide for the financial details to include static customer account details or one-time generated customer account details. In one embodiment, the pre-determined format may be a Track 1 or Track 2 data format of a financial transaction card.

Still further features of the invention provides for the financial details to include a serial number related to the dynamic key, the serial number providing an indication of the dynamic key used; the server having a database associated therewith which stores a list of keys and related serial numbers.

Yet further features of the invention provides for the server to be a server of an issuing authority at which a user has an account; and for financial details to be received from the mobile device of a user or a POS terminal of a merchant.

Further features of the invention provide for an expected session-specific token to be any token which may have been validly generated within a pre-determined amount of time; or to be any token which may have been validly generated a pre-determined amount of times since a previous transaction approval message has been transmitted.

A still further feature of the invention provides for the method to include the step of transmitting a transaction approval or a transaction rejection message to an electronic device of either the user or the merchant in response to the approval or rejection of the financial details for use.

The invention extends to a system for providing financial details from a mobile device of a user for use in a transaction, the system being provided on a mobile device of the user and including:

a token generating component associated with the mobile device for generating a session-specific token by applying an algorithm stored on the token generating component with a dynamic key;

a financial details component for providing financial details in a pre-determined format for use in a transaction a format modifying component for incorporating the session-specific token and the financial details into a modified form of the financial details; and a communication component for transferring the modified form of the financial details in the pre-determined format from the mobile device to initiate the transaction.

Further features of the invention provide for the format modifying component to incorporate the session-specific token and the financial details into a modified form of the financial details by inserting the session-specific token into redundant characters in the pre-determined format; or by encrypting a portion of the characters of the financial details with the session-specific token.

In one embodiment of the invention, the algorithm stored on the token generating component may include an individual seed value for a customer; and wherein the modified form of the financial details may include a readable customer identifier. In another embodiment, the algorithm stored on the token generating component may include a seed value for an issuing authority; and wherein the modified form of the financial details may include a readable issuing authority identifier and an initialization vector.

In one embodiment of the invention, the modified form of the financial details is transferred to a point-of-sale (POS) terminal of a merchant, from where it is further transferred to the issuing authority.

The invention extends to a mobile device having a hardware security module having a memory component for storing at least an algorithm, a seed value and a pre-determined format; and the token generating component applying the algorithm with input values including at least the seed value and a dynamic key.

Further features of the invention provide for the token generating component to be a cryptographic expansion device that can be attached to a communication component of the mobile device; and for the cryptographic expansion device to be configured to be used with the mobile device without requiring any changes to the internal software or hardware of the mobile device and without requiring any modification to the communication protocols used by the mobile device.

A still further feature of the invention provide for the cryptographic expansion device to be a cryptographic label that includes a hardware security module (HSM) disposed therein including a secure processing unit and a public processing unit.

In one embodiment of the invention, the cryptographic label also includes a first set of electrical contacts disposed on the top side of the cryptographic label for interfacing to a mobile device, and a second set of electrical contacts disposed on the bottom side of the cryptographic label for interfacing to a communication component. A coupling element may also be provided to attach the cryptographic label to the communication component. In an exemplary embodiment, the mobile device can be a mobile phone, the communication component can be a subscriber identity module (SIM) card, and the coupling element used for attaching the cryptographic label to the communication component can be an adhesive material disposed on the cryptographic label.

The invention extends to a system for determining the validity of financial details, the system being provided at a server and including:

a receiving component for receiving a pre-determined format of financial details for a transaction;

an extracting component for extracting a session-specific token from the pre-determined format;

a token generating component associated with the server for generating at least one expected session-specific token by applying an algorithm with a dynamic key;

a comparing component for comparing the at least one expected session-specific token and the extracted session-specific token; and in response to the extracted session-specific token matching at least one expected session-specific token, approving the received financial details for use; or, in response to the extracted session-specific token matching none of the at least one expected session-specific tokens, rejecting the financial details for use.

Further features of the invention provides for the server to be a server of an issuing authority at which a user has an account; and for financial details to be received from a POS terminal of a merchant.

A yet further feature of the invention provides for the system to include a transmission component for transmitting a transaction approval or a transaction rejection message to an electronic device of either the user or the merchant in response to the approval or rejection of the financial details for use.

The invention extends to a computer program product for providing financial details from a mobile device of a user for use in a transaction, the computer program product comprising a computer-readable medium having stored computer-readable program code for performing the steps of:

generating, on a token generating component associated with the mobile device, a session-specific token by applying an algorithm stored on the token generating component with a dynamic key;

providing financial details in a pre-determined format for use in a transaction;

incorporating the session-specific token and the financial details into a modified form of the financial details; and transferring the modified form of the financial details in the pre-determined format from the mobile device to initiate the transaction.

The invention further extends to a computer program product for determining the validity of financial details, the computer program product comprising a computer-readable medium having stored computer-readable program code for performing the steps of:

receiving a pre-determined format of financial details for a transaction;

extracting a session-specific token from the pre-determined format;

generating, on a token generating component associated with the server, at least one expected session-specific token by applying an algorithm with a dynamic key;

comparing the at least one expected session-specific token and the extracted session-specific token; and in response to the extracted session-specific token matching at least one expected session-specific token, approving the received financial details for use; or, in response to the extracted session-specific token matching none of the at least one expected session-specific tokens, rejecting the financial details for use.

DETAILED DESCRIPTION

Figure 1:
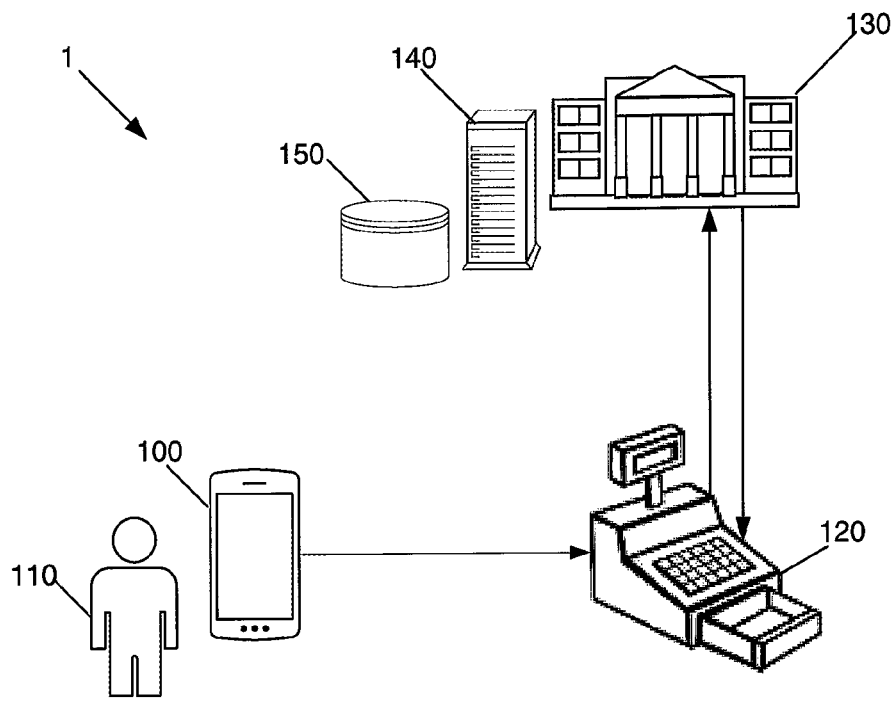
FIG. 1 is a system for providing financial details from a mobile device in accordance with an embodiment of the present invention.

FIG. 1 shows a system (1) for providing financial details from a mobile device. The system includes a mobile device (100) of a user (110), a point of sale terminal (120) of a merchant, and an issuing authority (130) at which the user (110) has an account. The issuing authority has associated therewith a server (140) and a database (150). In the present embodiment, the mobile device (100) is a smartphone, however the mobile device (100) may alternatively be a feature phone.

Figure 2:
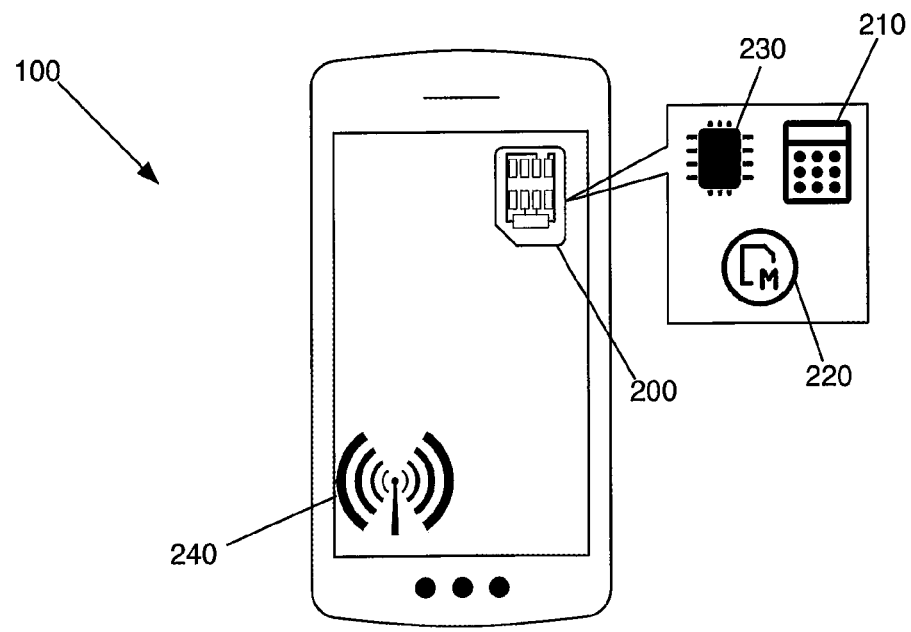
FIG. 2 is an embodiment of a mobile device of the system of FIG. 1 in accordance with the present invention.

The mobile device (100) of FIG. 1 is shown in more detail in FIG. 2. The mobile device includes an encryption component, in the present embodiment a hardware security module (HSM) (200). The HSM includes a token generating component (210), a financial details component, in the present embodiment a non-volatile memory module (220), and a format modifying component, in the present embodiment a processor (230). The mobile device also has a communication component (240) by means of which it can receive and send data.

In at least one embodiment of the invention, the mobile device differs from devices that may solely use software to encrypt communications between an electronic device and a target device or system. An electronic device that solely uses software to encrypt communications may comply with only a security level 1 of the Federal Information Processing Standard 140-2 (FIPS 140-2), which provides only a minimum level of security to protect sensitive information. In contrast, the HSM within an electronic device or controller according to some embodiments of the invention is compliant with at least a security level 2 of the FIPS 140-2 standard. More preferably, the HSM within the electronic device or controller in embodiments of the invention is compliant with security level 3 or level 4 of FIPS 140-2.

The HSM in embodiments of the invention uses hardware to encrypt data instead of solely performing the encryption in software. The HSM provides enhanced protection over software encryption technologies. For example, the HSM provides secure key management to generate cryptographic keys, sets the capabilities and security limits of keys, implements key backup and recovery, prepares keys for storage and performs key revocation and destruction. In some embodiments, the HSM is implemented as a dual processor device that includes a secure processor with storage and a public processor with storage. The HSM may also include a physical or logical separation between interfaces that are used to communicate critical security parameters and other interfaces that are used to communicate other data. The HSM can also provide a tamper-proof mechanism that provides a high risk of destroying the HSM and the cryptographic keys stored therein, if any attempt is made to remove or externally access the HSM.

Figure 3:
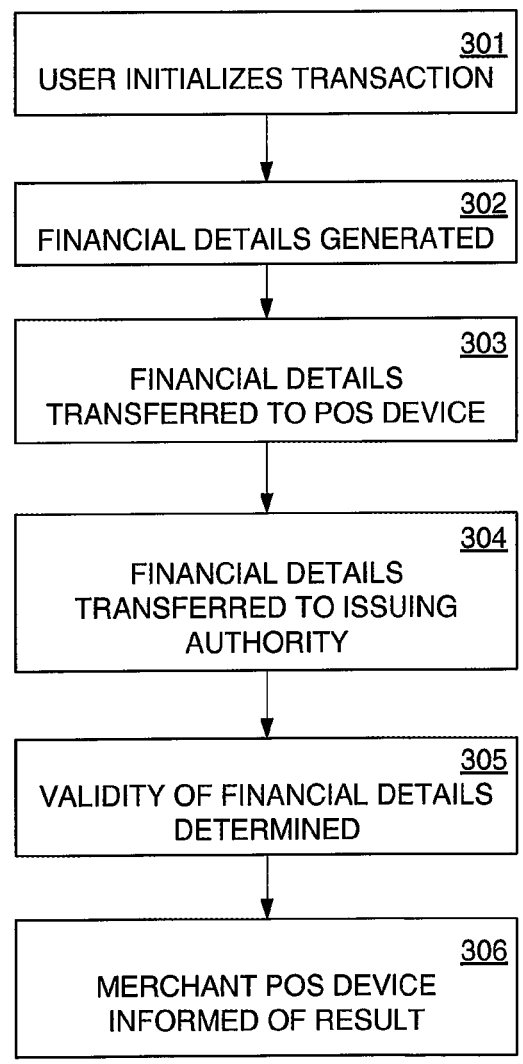
FIG. 3 a flow diagram of an embodiment of a method of operation of the system of FIG. 1.

FIG. 3 shows a flow diagram of an example operation of the system of FIG. 1. When a user (110) wishes to transact with a merchant, the user indicates on an input component of the mobile device (100), typically a keyboard, that he or she wishes to generate financial details required to complete the transaction in a first step (301). The financial details are generated on the mobile device (100) of the user (110) in a next step (302), and are transmitted to the POS terminal (120) in a further step (303). From the POS terminal (120), the details are transmitted to the issuing authority (130) at which the user has an account in a next step (304). At the issuing authority (130), the validity of the financial details is verified in a next step (305). Finally, the merchant is informed of the result of the verification of the details in a final step (306).

The financial details are presented in a format compliant with POS devices. In the present embodiment of the invention, that format is Track 2 financial transaction card format. By using a data format that a point of sale device is used to handling, the least number of modifications need to be made to currently in-use POS terminals and transmission protocols to allow them to facilitate the operation of the invention.

Figure 4:
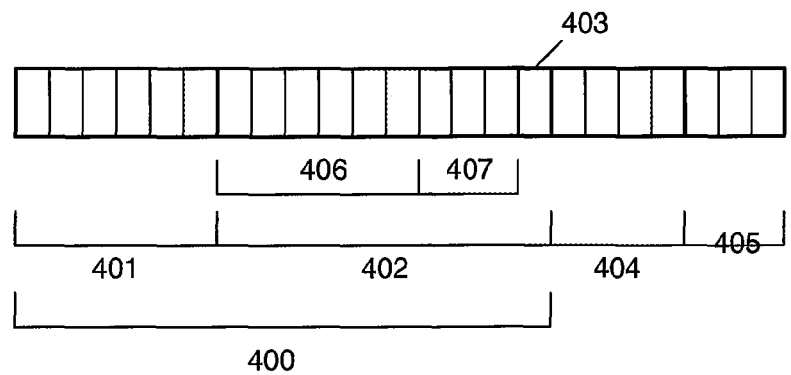
FIG. 4 is an example of a financial detail structure used in the method of FIG. 3.

Track 2 financial transaction card data include a number of digits in a pre-determined format. An example of data included in Track 2 data is shown in FIG. 4. The data includes a personal account number (PAN) field (400), which is made up of a bank identification number (BIN) field (401) of 6 characters and an account number field (402) of the user, of 10 characters. A BIN is an identifier of an institution who issued the financial data, such as an issuing authority, or of an issuing authority at which a user has an account. The account number includes a check digit (403) of a single character. Also included in the Track 2 data is an expiry date field (404) of 4 characters and a card verification value (CVV) field (405) of 3 characters. It should be noted that FIG. 4 only shows an extract of the data fields in Track 2 data, and that the actual format includes various other fields, such as field separators, and initialization fields, a termination field, as well as other data fields.

Figure 5:
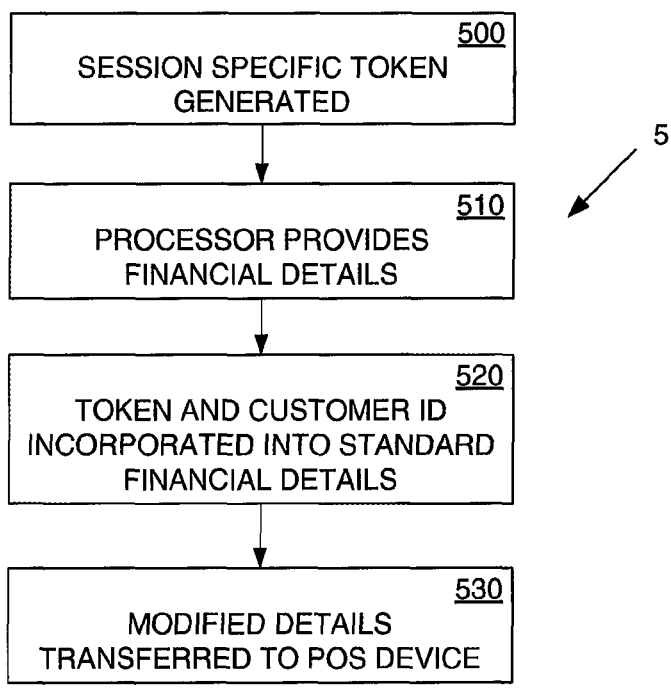
FIG. 5 is a flow diagram of an embodiment of a method performed on the mobile device of FIG. 2 in accordance with the present invention.

A method performed on the mobile device for providing financial details is illustrated in the flow diagram (5) shown in FIG. 5. The method is performed on a mobile device as illustrated in FIG. 2 and the reference numerals for the components of FIG. 2 are used.

In a first step (500), a session specific token is generated on the token generating component (210) of the mobile device. It is envisaged that the mobile device will only generate a session-specific token upon a request from the user to do so.

To generate the token, the token generating device uses an algorithm which is stored on the token generating component (210) in the HSM (200). The algorithm requires a seed value as input, the seed being unique to the user (110). The seed value is stored in the memory module (220). The algorithm further requires a dynamic key as an input value. In the present embodiment, the dynamic key used is a counter value which is also stored on the memory module.

After each determination of a session-specific token using the algorithm and dynamic key, the counter is increased. The initial counter value and the seed value of a user are known by the issuing authority (130).

In a next step (510), the processor (230) provides financial details relating to a payment card of the user, in the present embodiment payment card details in the form of Track 2 data may be stored in the memory module (210).

In a next step (520), the session specific token is incorporated into data fields of the Track 2 data which is available for a part of the account number and the CVV and, optionally, the expiry date. In the present embodiment, these fields are not essential for the transfer of payment credentials, and may be considered redundant. In the present embodiment, three characters of the session-specific token are incorporated in a last part (407), before the check digit (403), of the account number field (402), and three characters are incorporated in the CVV field (405).

A first part (406) of the account number field (402) is used to transmit the customer ID number, which is stored in and retrieved from the memory module (220). In combination, the last part (407) of the account number field and the CVV field (405) provide space for a 6-digit token to be inserted. The result of the incorporated of the session-specific token and the customer ID number into the Track 2 data is a modified form of the financial details.

In a final step (530), the modified form of the financial details is transferred to a POS terminal that is still in a format compatible with the POS terminal. In effect, certain numeric characters in the Track 2 data have been altered.

The point of sale device transmits the modified form of the financial details received to the issuing authority (130) in a similar manner as is currently known for transactions involving a physical payment card. The modified form of the financial details is sent along with details of the transaction, including, for example, the price payable and a merchant identifier, as is common practice in payment systems using POS terminals. The BIN number (401) indicates to the POS terminal to which issuing authority the details are to be sent.

Figure 6:
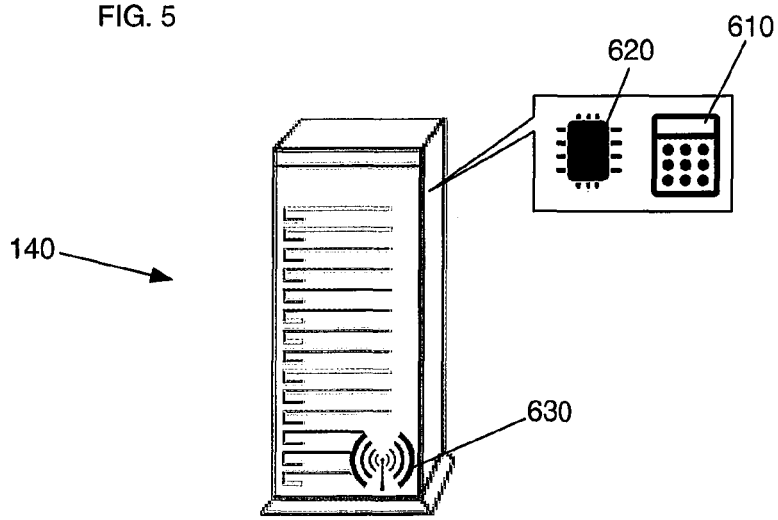
FIG. 6 is an embodiment of a server of the system of FIG. 1 in accordance with the present invention.

An embodiment of the server (140) of FIG. 1 is shown in more detail in FIG. 6. The server (140) includes a token generating component (610), an extraction component, and a comparison component. In the present embodiment, the extraction component and the comparison component are provided by a processor (620). The server also has a communication component (630) by means of which data can be sent and received. The communications component functions as both a receiving component and a transmission component, for receiving and transmitting data.

Figure 7:
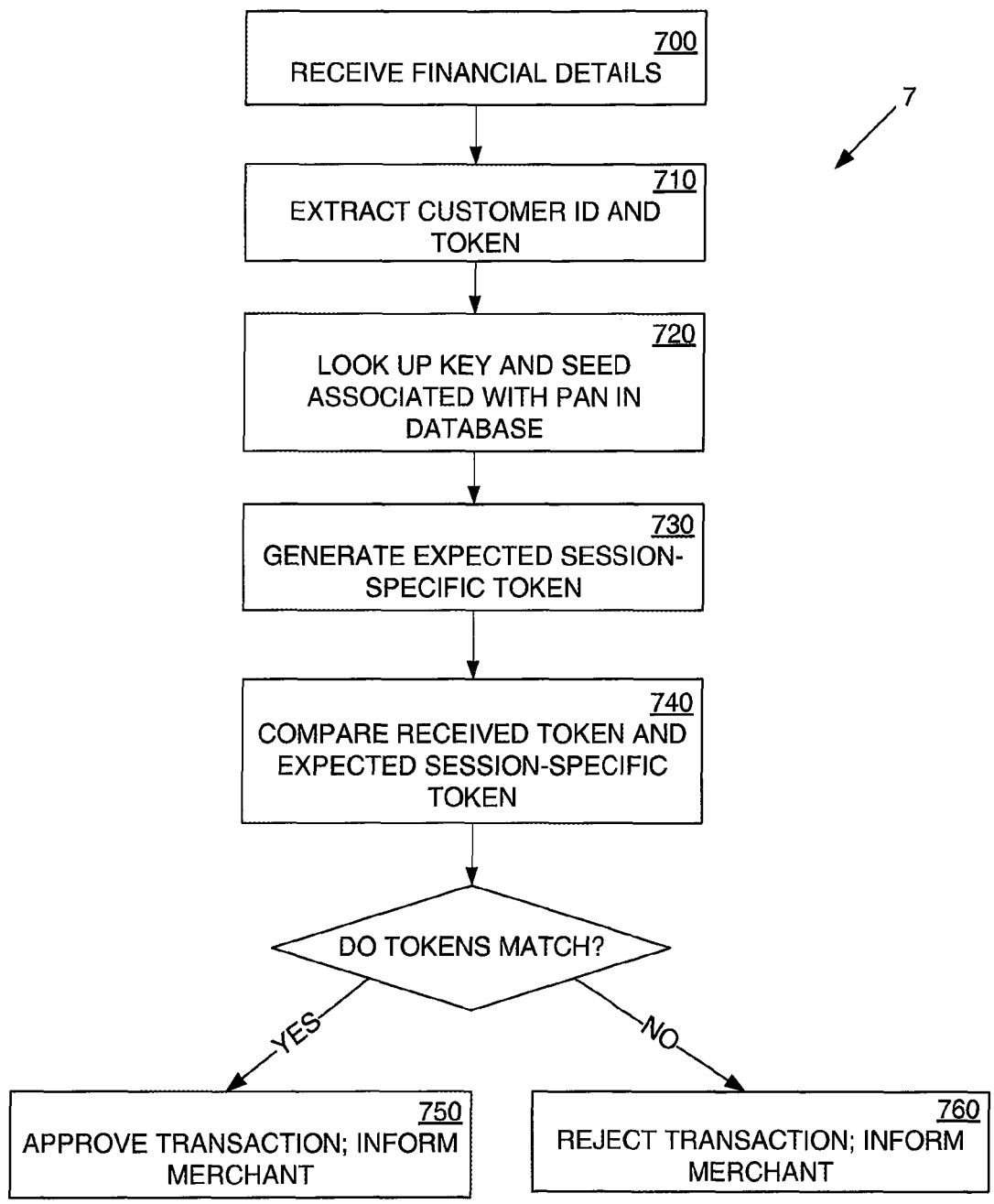
FIG. 7 is a flow diagram of an embodiment of a method in accordance with the present invention performed on the server of FIG. 6.

A flow diagram (7) illustrating the method followed by the server (140) of a issuing authority in determining the validity of received financial details in accordance with an embodiment of the invention is illustrated in FIG. 7. In a first step (700), the issuing authority receives financial details in an expected format. In the present embodiment, the expected format is a modified form of the Track 2 data as described above.

Since a customer ID number is contained in the first part (407) of the account number field (402) in an unaltered form, the server can extract the customer ID number directly from the details received in a next step (710). Since the fields in which a session-specific token should be included are also known to the issuing authority, a token is also extracted by the server in this step (710) from the last part (406) of the account number field (402) and the CVV field (405).

The database (150) has stored thereon a list containing the details of user accounts, including the customer ID number of each user account and the counter value and seed value associated with each user account. The counter value and seed are retrieved by the server in a next step (720), by looking up the key and seed associated with the customer ID number extracted from the financial details received in the previous step (710).

In a next step (730), the server applies an algorithm related to the algorithm that is stored on the memory module (220) of the HSM (200) on the user's mobile device (100), using the seed value and counter value retrieved from the database (150), to obtain an expected session-specific token. The server utilizes its token-generating component (710) for calculating expected session-specific tokens.

The server then compares the expected session-specific token to the received token in a next step (740). If the tokens match, the transaction is approved, and an approval message is transmitted to the merchant in a final step (750) via the communication component (730). If the tokens do not match, the transaction is rejected, and a rejection or failure message is transmitted to the merchant in a final step (760) via the communication component (730). If the transaction is approved, the server is expected to deal with the transfer of money in a standard manner. After a successful comparison, the counter value stored in the database relating to the user account concerned is increased in the same manner as it would have occurred on the user's mobile device when then session-specific key was originally generated. The approval or rejection message may also be sent to the user's mobile device.

It is envisaged that the seed value may constitute the dynamic key itself. In such a situation, only the dynamic key will be used as input value for generating a session-specific token, and the server will only need to look up the dynamic key to generate the same token instead of looking up the dynamic key and the seed value.

It should be noted that in the embodiment described above, the session-specific token is generated without a direct communication channel to the issuing authority. Therefore, the token generation can be considered as offline token generation, wherein the validity of the token can be assessed by the issuing authority at a later stage.

In another embodiment of the invention, both the HSM and the database have a set of pre-calculated keys which can be used to generate a session-specific token. In such an embodiment, a section of the Track 2 data field can be used to indicate which of these keys have been used by the token generating component to generate the specific token, in effect by using a key serial number. For example, if there are ten different tokens, a single digit, with numerals 0 to 9, can be used to indicate which of the keys have been used in the encryption process. It should be noted that this digit must not be encrypted in the modified form of the financial details if it is transmitted as part of the modified form of the payment credentials. The server can then look up the key used in the database, using the serial number of the key received. Alternatively, the key used can be based on a counter value, and the token generating component will use the different keys in a standard format or according to another algorithm, both being determinable by the issuing authority's token generating component by looking the values up in its associated database. A key that changes in this manner can also be described as a dynamic key.

In the embodiment described above, tokens will need to be validated by an issuing authority in the order in which they are generated by the token generating component on the mobile device. If a generated token does not reach the issuing authority, the counter on the mobile device and the counter in the database will be out of sync, and a token generated at the server will not be the same as a token received from the POS terminal. It is envisaged that in at least some embodiments, the server will test the validity by applying a counter increased by, for example, three times' use. In such an embodiment, the server will compensate for a delay in tokens received. The server may be configured to inform the user if the counter values at the mobile device and server are suspected to be out of sync in this manner.

Also in the embodiment described above, the session-specific token has been included in redundant characters of the Track 2 data; however, it is also envisaged that some of the characters may be encrypted, either by means of a one-way hash function, an RSA token, or indeed any cryptographic function that renders a different result upon every operation performed with differing input values. A person skilled in the art would appreciate that there are indeed a large variety of cryptographic functions that can perform such a function.

It is further envisaged that the expiry date field (404) may be used as another field in which characters of the session-specific key may be stored. However, it should be noted that a POS terminal may automatically reject financial details if the details are in an invalid format, or in a format that will constitute a date that has passed, or a date that is too far in the future. Typically, any date more than 4 years in the future will be rejected. Similarly, any month field that is not from 01 to 12 will be invalid, and any day field that is not from 1 to 31 will be invalid. Some POS devices may also reject a day field if the relevant month does not have that many days, for example the second month, February, or 02, cannot have 30 days. Including the expiry date field as a field in which characters of a session-specific token may be stored will increase the possible length of the token, although the specific characters that may be used or which may be used together are limited. Any system which makes use of the expiry date field should be configured to only include acceptable characters in this field.

Figure 8:
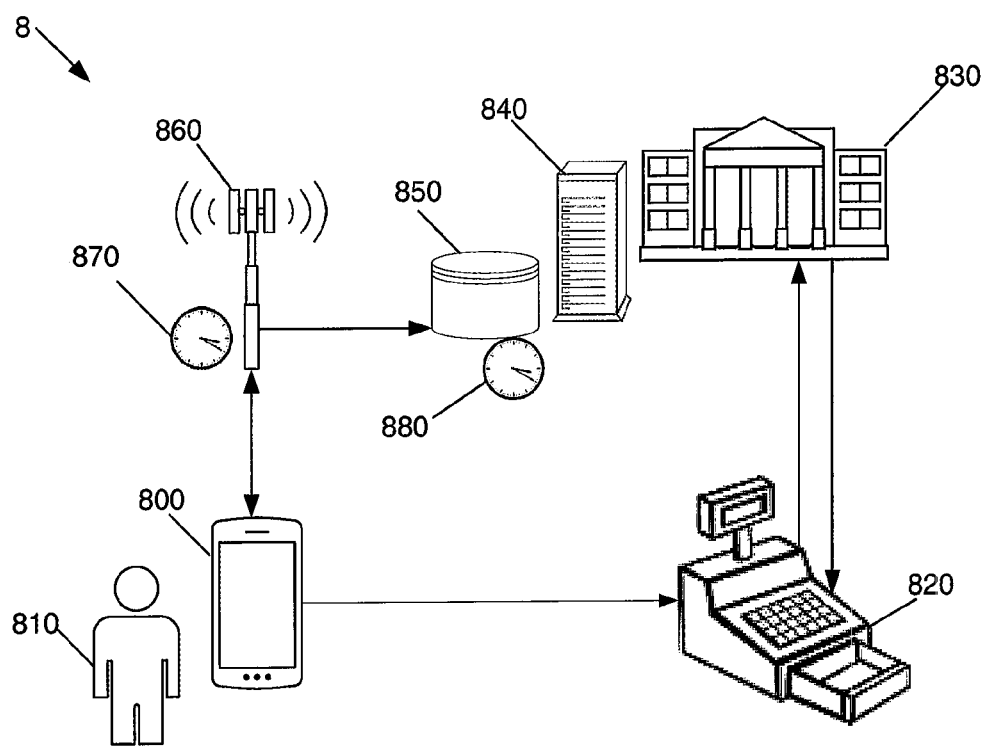
FIG. 8 is an embodiment of a system for providing financial details from a mobile device in accordance with a further embodiment of the invention.

FIG. 8 shows an embodiment of a system (8) in which the dynamic key is time-based, instead of based on counter value as described above. This may be referred to as "time-based encryption". The system includes a mobile device (800) of a user (810), a point of sale terminal (820) of a merchant, and an issuing authority (830). The financial system has associated therewith a server (840) and a database (850). In the present embodiment, as in the embodiment described with reference to FIG. 1, the mobile device is a smartphone. The mobile device (800) is in communication with a mobile base station which has a clock (870). The database (850) also has a clock (880) which is synchronized with the clock (870) of the base station.

Modern smartphones, and indeed the mobile device (800) of the present embodiment, are able to retrieve the current time from a clock at a mobile base station. Accordingly, upon the device being requested to generate a session-specific token, the mobile device (800) obtains the time from the clock (870) of the base station (860). At least a part of this time is used as a dynamic key for an input value in the algorithm, negating the need for a counter value as dynamic key. In the present embodiment, the hours and minutes of the current time is used as an input value. The session-specific token obtained from application of the algorithm is then handled in exactly the same way as described above, in that the token replaces some of the characters in financial details in a standard format that is stored on the HSM, and the modified financial detail is transferred to a POS terminal. Similarly, a customer ID number is included in the modified format as well. The modified financial details format is identical to the format described with reference to FIG. 4. The POS terminal transfers the modified financial details to the issuing authority as described above.

Figure 9:
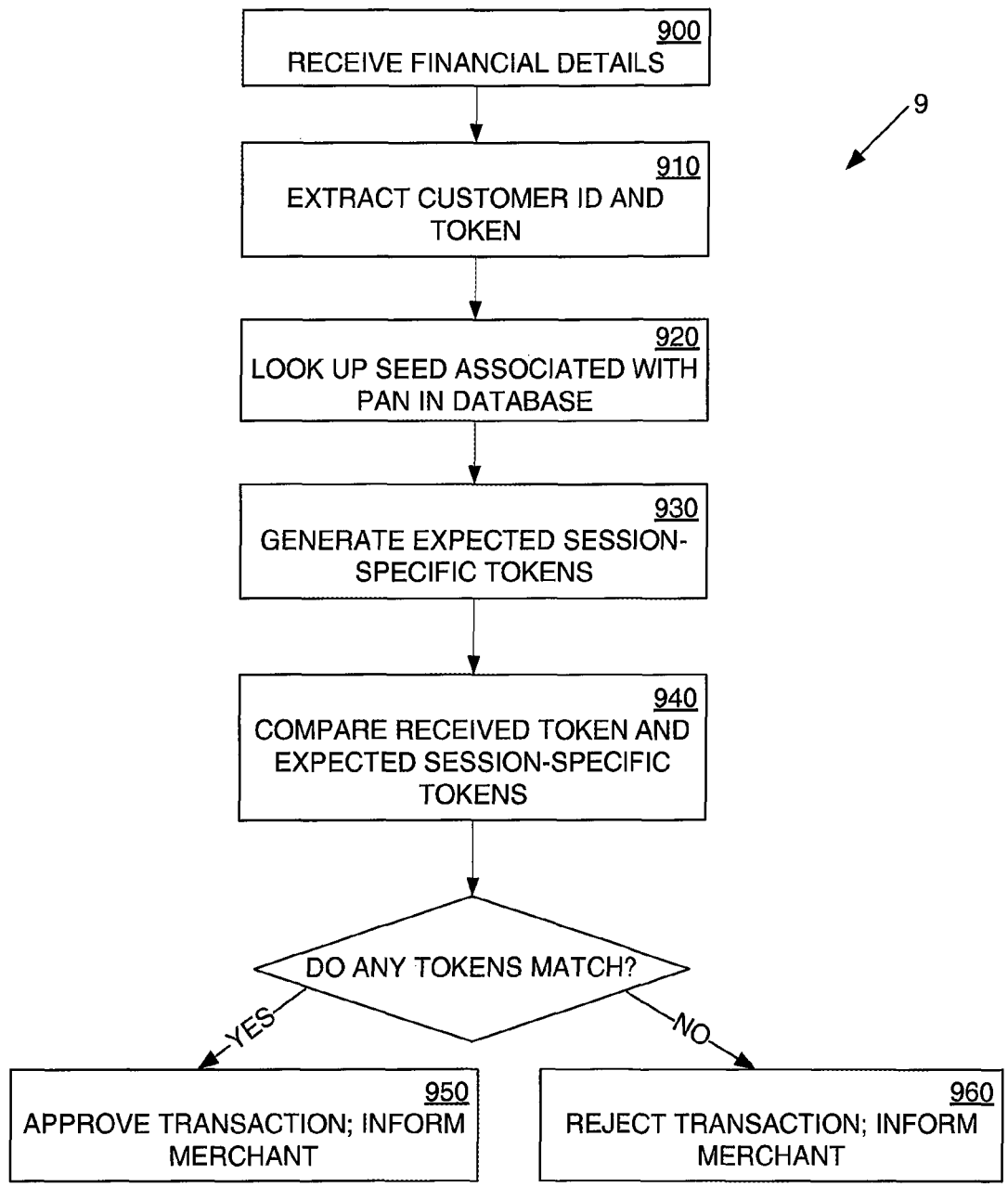
FIG. 9 is a flow diagram of an embodiment of a method in accordance with the present invention performed at the server of the system of FIG. 8.

A method of determining the validity of the credentials received by the server (940) in accordance with the present embodiment of a time-based dynamic key is illustrated by the flow diagram (9) shown in FIG. 9. In a first step (900), the issuing authority receives financial details in an expected format. In the present embodiment, the expected format is a modified form of the Track 2 data as described above. The inclusion of the BIN in the modified form of the Track 2 data in an unaltered, standard format allowed the POS terminal (820) to transmit the data to an appropriate issuing authority (830).

Since a customer ID number is contained in the first part (407) of the account number field (402) in an unaltered form, the server can extract the customer ID number directly from the details received in a next step (910). Since the fields in which a session-specific token should be included are also known to the issuing authority, a token is also extracted by the server in this step (910) from the last part (406) of the account number field (402) and the CVV field (405).

The database (750) has stored thereon a list containing the details of user accounts held at the issuing authority, including the customer ID number of each user account and the counter value associated with each user account. The seed value is retrieved by the server in a next step (920), by looking up the seed associated with the customer ID number extracted from the financial details received in the previous step (900).

In a next step (930), the server applies an algorithm related to the algorithm that is stored on the memory module (220) of the HSM (200) on the user's mobile device (100), using the seed value retrieved. The server has a token-generating component associated therewith which is similar to the token-generating component (210) of the HSM (200) for calculating expected session-specific tokens. The server also uses the time of its clock (780), which is synchronized with the clock (770) of the mobile base station (760), as input value, in order to obtain an expected session-specific token. As with the generation of the original session-specific token, the hours and minutes of the current time is used. In the present embodiment, the lifetime of a session-specific key is ten minutes, and the server also generates expected tokens for the previous ten minutes. As only the current hour and minutes are used as input values, and not the seconds, ten expected tokens need to be determined for a session-specific token lifetime of ten minutes.

The server then compares the ten expected session-specific tokens to the received token in a next step (940). If the received token matches any of the expected tokens, the transaction is approved, and an approval message is transmitted to the merchant in a final step (950). If none of the expected tokens match the received token, the transaction is rejected, and a rejection or failure message is transmitted to the merchant in a final step (960). If the transaction is approved, the server is expected to deal with the transfer of money in a standard manner. It should be noted that since there is no counter value present, no alterations need to be made to the database after successful completion of a transaction.

Although it has only be described that the hour and minutes are used as input values for the time-based encryption described above, other elements of time may also be used. For example, the day, month or year of the current time may all be used, or even the seconds, milliseconds, or the like, as input values. It should be noted that the inclusion of these elements may increase the amount of expected session-specific tokens to which a received token need to be compared, depending on the lifetime of a session-specific token. For example, a session-specific token which is valid for 2 minutes and which uses seconds of time as input value to the algorithm, as there are 120 seconds in two minutes.

Figure 10:
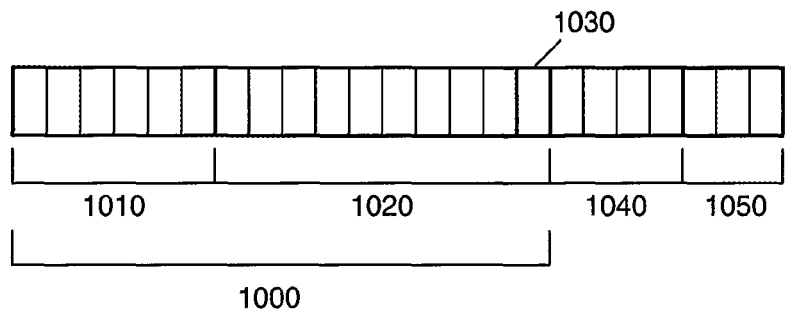
FIG. 10 is a second example of a financial detail structure used in a method of operation of the mobile device of FIG. 2.
Figure 11:
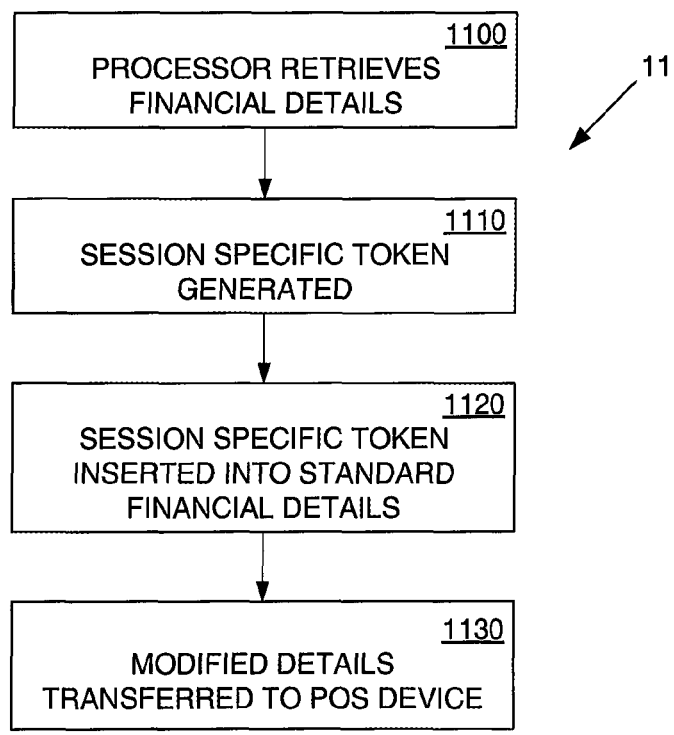
FIG. 11 is a flow diagram of an embodiment of a method in accordance with the present invention performed on the mobile device of FIG. 2 and using the financial detail structure of FIG. 10.

In FIG. 10, the example of data forming part of Track 2 data as shown in FIG. 4 is repeated. The data includes a personal account number (PAN) field (1000), which is made up of a bank identification number (BIN) field (1010) of 6 characters and an account number field (1020) of the user, of 10 characters. The account number includes a check digit (1030) of a single character. Also included in the Track 2 data is an expiry date field (1040) of 4 characters and a card verification value (CVV) field (1050) of 3 characters. It should be noted that FIG. 10 only shows an extract of the data fields in Track 2 data, and that the actual format includes various other fields, such as field separators, initialization fields, a termination field, as well as other data fields. In the present embodiment, all HSM modules issued by a specific issuing authority have the same algorithm stored thereon. This data is, however, modified differently to the data that was described with reference to FIG. 4. A flow diagram illustrating an alternative method performed on the mobile device of FIG. 2 is shown in FIG. 11. The mobile device forms part of the same system (1) that was described above with reference to FIG. 1.

In a first step (1100), the processor (230) provides financial details relating to a payment card of the user, in the present embodiment again payment card details in the form of Track 2 data may be stored in the memory module (220) of the HSM (200).

In a next step, the token generating component (1110) generates a session-specific token of up to 9 characters long, using an encryption algorithm to encrypt a customer identification number with input values including a seed value and a dynamic key. The algorithm also uses an initialization vector (IV) as input value. In the present embodiment, the IV may be a random one-time CVV value, which is determined by the token generating component (210) prior to generating the session-specific token. The algorithm and seed value is stored on the memory module (220), and are linked to the specific issuing authority which is to approve or reject the transaction. The customer identification number may also be stored on the memory module (220).

In the present embodiment of the invention, every user which has a financial account at a specific issuing authority and who makes use of the system and method of the invention is in possession of the same key and a corresponding decryption algorithm.

The up to 9 characters of the session-specific token is inserted into the account number field (1020) not including the check digit (1030) field, and the random CVV value, which is also the IV, is inserted into the CVV field (1050) in a next step (1120), to arrive at a modified form of the financial details. In a final step (1130), the modified financial details are transmitted to the POS device (120).

The point of sale device transmits the modified form of the financial details received to the issuing authority (130) in a similar manner as is currently known for transactions involving a physical payment card. The modified form of the financial details is sent along with details of the transaction, including the price payable and a merchant identifier, as is currently known. The BIN number indicates to the POS terminal to which issuing authority the details are to be sent.

Figure 12:
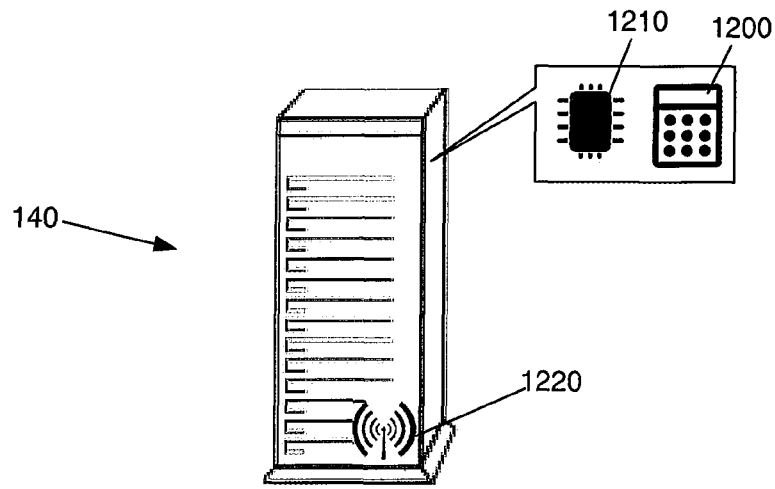
FIG. 12 is an embodiment of a server of the system of FIG. 1 in accordance with the present invention.

A further embodiment of the server (140) of FIG. 1 is shown in more detail in FIG. 12. The server includes an extraction component, a comparing component, and a token decryption component (1200). In the present embodiment, the extraction component and the comparing component are provided by a processor (1210). The server also has a communication component (1220) by means of which data can be sent and received. The communications component functions as both a receiving component and a transmission component, for receiving or transmitting data.

Figure 13:
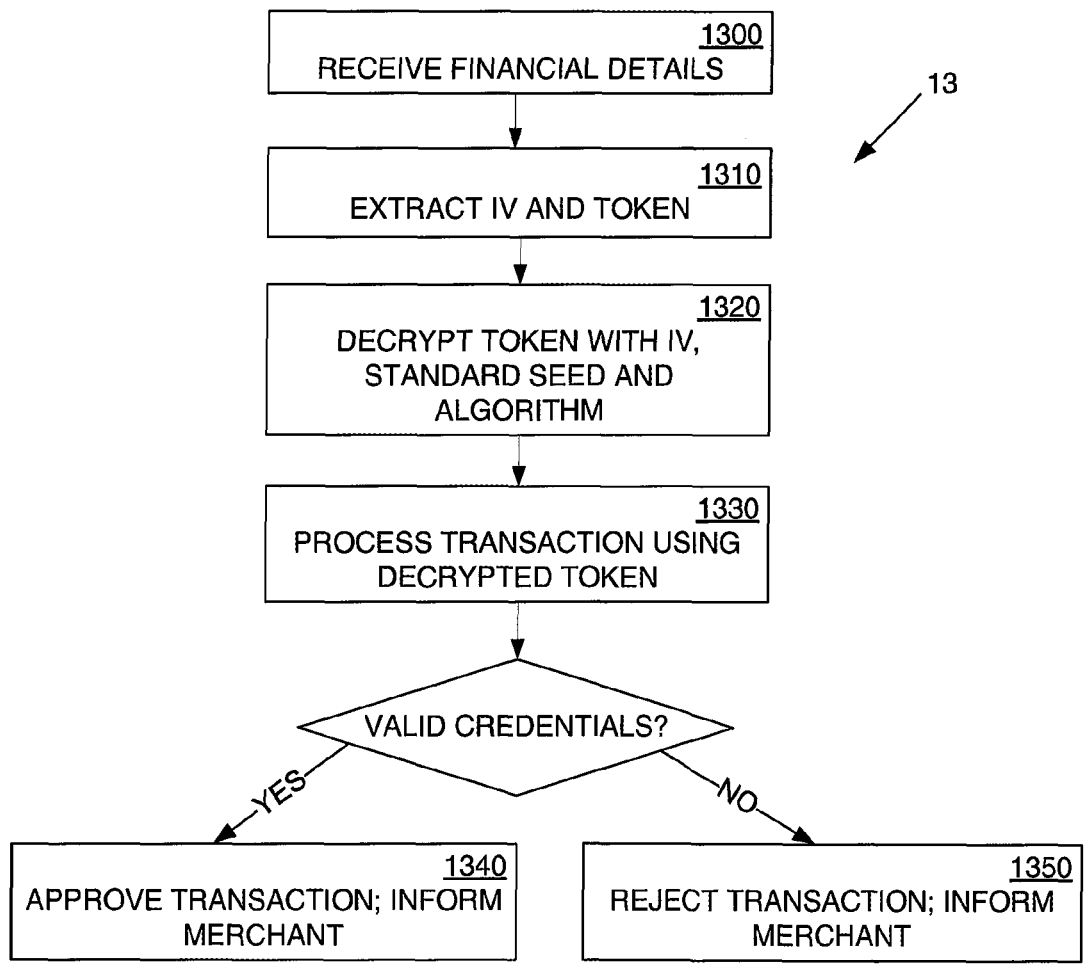
FIG. 13 is a flow diagram of an embodiment of a method in accordance with the present invention performed at the server of FIG. 12.

A flow diagram (13) illustrating the method followed by the server (140) of an issuing authority in determining the validity of received financial details in accordance with the present embodiment of the invention is illustrated in FIG. 13. In a first step (1300), the issuing authority receives financial details in an expected format via the communication component (1220). In the present embodiment, the expected format is a modified form of the Track 2 data as described above.

Since every modified form of financial details received by an issuing authority is expected to have been encrypted with the same algorithm and seed value, a related same decryption algorithm and seed value can be used by the server to decrypt any received modified financial details.

In a next step (1310), the server extracts the IV from the CVV field and the token from the account number field with the processor (1210). In combination with the standard seed and algorithm, the IV is used to decrypt the token in the account number field, using the decryption component (1200) to extract the customer identification number in a next step (1320).

The transaction is then processed in the normal manner in a next step (1330), using the result of the decryption algorithm. If the credentials obtained using the decryption algorithm is valid, the transaction is approved, and an approval message is transmitted to the relevant merchant in a final step (1340), using the communication component (1220). If the credentials are not valid, the transaction is rejected, and a rejection or denial message is transmitted to the merchant in a final step (1350) using the communication component (1220).

It is envisaged that different algorithms may be stored on a memory module of the HSM, with each algorithm being coupled to a specific issuing authority. By selecting a specific set of financial details to use in a transaction, the HSM will use the appropriate set of details in order to produce a session-specific token with an algorithm that the specific issuing authority can decrypt or interpret.

It should also be noted that the providing of the financial details by the mobile device may be facilitated by a computer program product, such as an application or a program, operating on the mobile device. The computer program product will typically need to be stored in a computer-readable medium in the form of a computer-readable program code, and will be configured to enable the performance of the method on the mobile device as described earlier with reference to FIG. 5 and FIG. 11. Similarly, the determining of the validity of financial details on the server may be facilitated by a computer program product, such as an application or a program, operating on the server. The computer program product will typically need to be stored in a computer-readable medium in the form of a computer-readable program code, and will be configured to enable the performance of the method on the server as described earlier with reference to FIG. 6 and FIG. 12.

In at least one embodiment of the invention, the financial details are not stored on a memory element (220) of the mobile device, and are rather obtained from the issuing authority. These financial details may be one-time use financial details, often referred to as one-time personal account numbers. These one-time use financial details may then be encrypted or modified as explained above. In such an instance, the server may be configured to remember which user has requested the one-time use financial details, and check when receiving financial details that the user from which the details appear to originate has in actual fact request credentials. This may provide additional security to a user wishing to use the systems and methods described.

Figure 14:
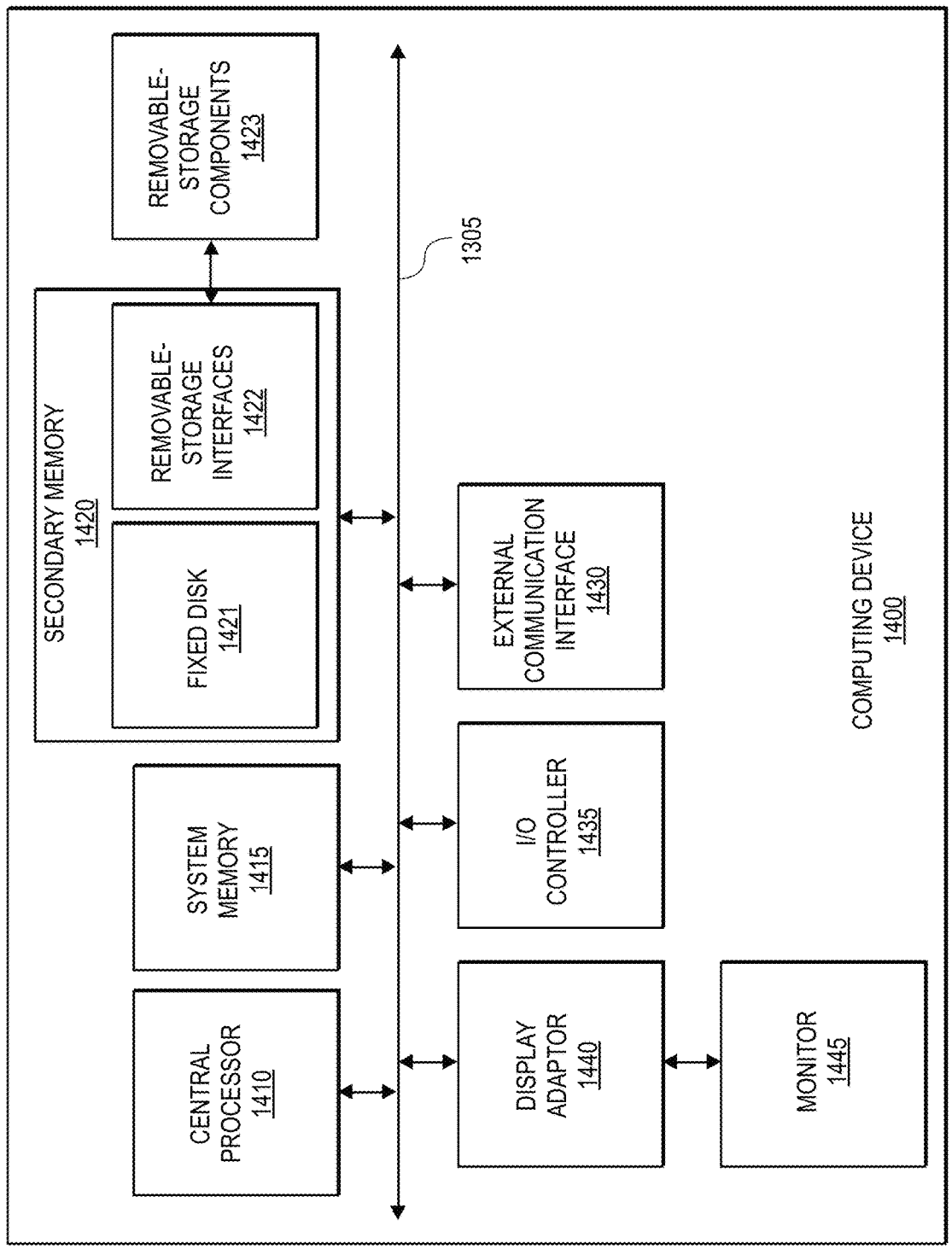
FIG. 14 is an embodiment of a computing device in accordance with the present invention.

FIG. 14 illustrates an example of a computing device (1400) in which various aspects of the disclosure may be implemented. The computing device (1400) may be suitable for storing and executing computer program code. The various participants and elements in the previously described system diagrams may use any suitable number of subsystems or components of the computing device (1400) to facilitate the functions described herein.

The computing device (1400) may include subsystems or components interconnected via a communication infrastructure (1405) (for example, a communications bus, a cross-over bar device, or a network). The computing device (1400) may include at least one central processor (1410) and at least one memory component in the form of computer-readable media.

The memory components may include system memory (1415), which may include read only memory (ROM) and random access memory (RAM). A basic input/output system (BIOS) may be stored in ROM. System software may be stored in the system memory (1415) including operating system software.

The memory components may also include secondary memory (1420). The secondary memory (1420) may include a fixed disk (1421), such as a hard disk drive, and, optionally, one or more removable-storage interfaces (1422) for removable-storage components (1423).

The removable-storage interfaces (1422) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (1422) may also be in the form of ports or sockets for interfacing with other forms of removable-storage components (1423) such as a flash memory drive, external hard drive, or removable memory chip, etc.

The computing device (1400) may include an external communications interface (1430) for operation of the computing device (1400) in a networked environment enabling transfer of data between multiple computing devices (1400). Data transferred via the external communications interface (1430) may be in the form of signals, which may be electronic, electromagnetic, optical, radio, or other types of signal.

The external communications interface (1430) may enable communication of data between the computing device (1400) and other computing devices including servers and external storage facilities. Web services may be accessible by the computing device (1400) via the communications interface (1430).

The external communications interface (1430) may also enable other forms of communication to and from the computing device (1400) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (1410).

A computer program product may be provided by a non-transient computer-readable medium, or may be provided via a signal or other transient means via the communications interface (1430).

Interconnection via the communication infrastructure (1405) allows a central processor (1410) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (1400) either directly or via an I/O controller (1435). These components may be connected to the computing device (1400) by any number of means known in the art, such as a serial port.

One or more monitors (1445) may be coupled via a display or video adapter (1440) to the computing device (1400).

Figure 15:
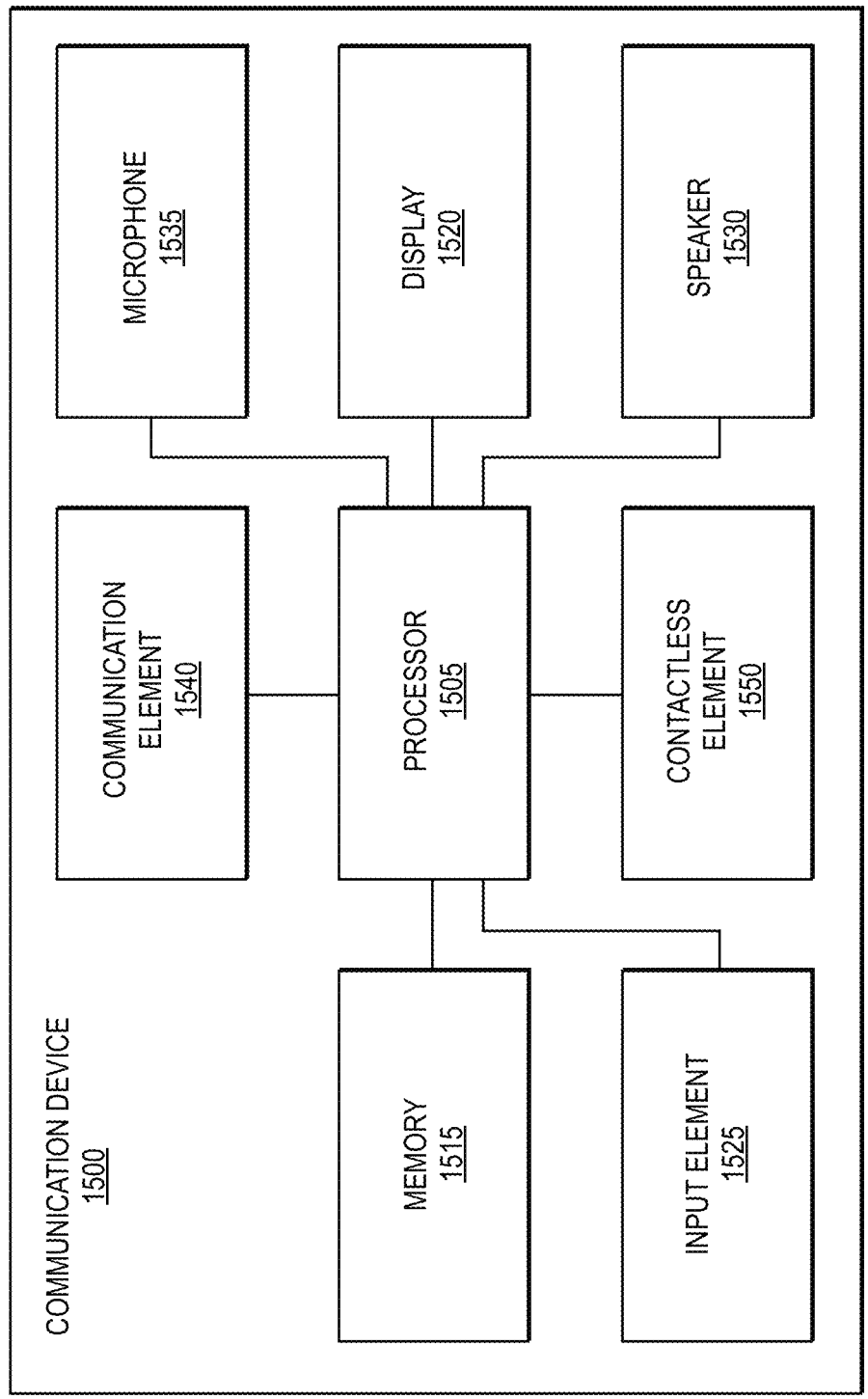
FIG. 15 is an embodiment of a block diagram of a communication device in accordance with the present invention.

FIG. 15 shows a block diagram of a communication device (1500) that may be used in embodiments of the disclosure. The communication device (1500) may be a cell phone, a feature phone, a smart phone, a satellite phone, or a computing device having a phone capability.

The communication device (1500) may include a processor (1505) (e.g., a microprocessor) for processing the functions of the communication device (1500) and a display (1520) to allow a user to see the phone numbers and other information and messages. The communication device (1500) may further include an input element (1525) to allow a user to input information into the device (e.g., input buttons, touch screen, etc.), a speaker (1530) to allow the user to hear voice communication, music, etc., and a microphone (1535) to allow the user to transmit his or her voice through the communication device (1500).

The processor (1510) of the communication device (1500) may connect to a memory (1515). The memory (1515) may be in the form of a computer-readable medium that stores data and, optionally, computer-executable instructions.

The communication device (1500) may also include a communication element (1540) for connection to communication channels (e.g., a cellular telephone network, data transmission network, Wi-Fi network, satellite-phone network, Internet network, Satellite Internet Network, etc.). The communication element (1540) may include an associated wireless transfer element, such as an antenna.

The communication element (1540) may include a subscriber identity module (SIM) in the form of an integrated circuit that stores an international mobile subscriber identity and the related key used to identify and authenticate a subscriber using the communication device (1500). One or more subscriber identity modules may be removable from the communication device (1500) or embedded in the communication device (1500).

The communication device (1500) may further include a contactless element (1550), which is typically implemented in the form of a semiconductor chip (or other data storage element) with an associated wireless transfer element, such as an antenna. The contactless element (1550) may be associated with (e.g., embedded within) the communication device (1500) and data or control instructions transmitted via a cellular network may be applied to the contactless element (1550) by means of a contactless element interface (not shown). The contactless element interface may function to permit the exchange of data and/or control instructions between mobile device circuitry (and hence the cellular network) and the contactless element (1550).

The contactless element (1550) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (1500) and an interrogation device. Thus, the communication device (1500) may be capable of communicating and transferring data and/or control instructions via both a cellular network and near field communications capability.

The data stored in the memory (1515) may include: operation data relating to the operation of the communication device (1500), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (1500) to selected receivers.

The communication device (1500) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at a server, transaction details in a predetermined format for use in a transaction;
retrieving, from the transaction details, a customer identification number;
retrieving, from the transaction details, a first portion of a session-specific token incorporated in a first location within the transaction details, the first location being before a check digit field of the transaction details in the predetermined format;
retrieving, from the transaction details, a second portion of the session-specific token incorporated in a second location within the transaction details different from the first location, the second location being before a CVV field of the transaction details in the predetermined format;
combining the first portion of the session-specific token with the second portion of the session-specific token to recreate the session-specific token;
determining, based on the retrieved customer identification number, a seed value unique to the customer identification number;
generating, by encrypting the customer identification number using the seed value, an expected token value;
comparing the session-specific token to the expected token value; and
validating the transaction details based on the comparison of the session-specific token to the expected token value.

2. The method of claim 1, wherein the predetermined format is a Track 2 data format.

3. The method of claim 2, wherein the first portion of the session-specific token is incorporated before a check digit field in the Track 2 data format.

4. The method of claim 1, wherein the customer identification number is also encrypted using a dynamic data element to generate the expected token value.

5. The method of claim 4, wherein the dynamic data element is a transaction counter.

6. The method of claim 5, further comprising incrementing the transaction counter upon validating the transaction data.

7. The method of claim 4, wherein the dynamic data element comprises a key randomly selected from a pre-calculated set of keys, and wherein the method further comprises:

receiving a key serial number; and determining the dynamic data element based on the received key serial number.

8. The method of claim 1, wherein the seed value comprises an initialization vector.

9. The method of claim 8, further comprising transmitting the initialization vector to a mobile device associated with the customer identification number prior to receiving the transaction details.

10. A server computer comprising:

a processor; and a memory including instructions that, when executed with the processor, cause the server computer to:

receive transaction details in a predetermined format for use in a transaction;

retrieve, from the transaction details, a customer identification number;

retrieve, from the transaction details, a first portion of a session-specific token incorporated in a first location within the transaction details, the first location being before a check digit field of the transaction details in the predetermined format;

retrieve, from the transaction details, a second portion of the session-specific token incorporated in a second location within the transaction details different from the first location, the second location being before a CVV field of the transaction details in the predetermined format;

combine the first portion of the session-specific token with the second portion of the session-specific token to recreate the session-specific token;

determine, based on the retrieved customer identification number, a seed value unique to the customer identification number;

generate, using the customer identification number and the seed value, at least one expected token value;

compare the session-specific token to the at least one expected token value; and validate the transaction details based on the comparison of the session-specific token to the at least one expected token value.

11. The server of claim 10, wherein the at least one expected token value comprises a plurality of expected token values.

12. The server of claim 11, further comprising determining a lifetime of the session-specific token, and wherein the plurality of expected token values corresponds to the determined lifetime of the session-specific token.

13. The server of claim 12, wherein the lifetime of the session-specific token is ten minutes and the plurality of expected token values comprises ten expected token values, wherein each of the plurality of expected token values is generated to correspond to a one-minute interval of the lifetime.

14. The server of claim 10, wherein the session-specific token comprises six digits, the first portion of the session-specific token comprises a first three digits of the session-specific token, and the second portion of the session-specific token comprises a last three digits of the session-specific token.

15. The server of claim 10, wherein at least a portion of the received transaction details is encrypted.

16. The server of claim 15, wherein the instructions further cause the server computer to decrypt the portion of the transaction details using the seed value.

17. The server of claim 10, wherein the instructions further cause the server computer to approve or decline the transaction upon validating the transaction details.

18. The server of claim 10, wherein the instructions further cause the server computer to reject the transaction upon failing to validate the transaction details.

19. The server of claim 10, wherein the transaction details comprises one-time use financial data.

* * * * *